US012502331B1

(12) United States Patent
DiPeri et al.

(10) Patent No.: US 12,502,331 B1
(45) Date of Patent: Dec. 23, 2025

(54) MASSAGING ROLLER

(71) Applicant: MyoStorm, LLC, Springville, UT (US)

(72) Inventors: Jonathan D. DiPeri, Springville, UT (US); Bailey Carlson, Springville, UT (US)

(73) Assignee: MyoStorm, LLC, Springville, UT (US)

( * ) Notice: Subject to any disclaimer, the term of this patent is extended or adjusted under 35 U.S.C. 154(b) by 778 days.

(21) Appl. No.: 17/840,541

(22) Filed: Jun. 14, 2022

Related U.S. Application Data

(60) Provisional application No. 63/210,463, filed on Jun. 14, 2021.

(51) Int. Cl.
*A61H 15/00* (2006.01)
*A61H 23/02* (2006.01)

(52) U.S. Cl.
CPC ......... *A61H 15/00* (2013.01); *A61H 15/0092* (2013.01); *A61H 23/0254* (2013.01); *A61H 2201/0107* (2013.01); *A61H 2201/0161* (2013.01); *A61H 2201/169* (2013.01)

(58) Field of Classification Search
CPC .... A61H 2201/1695; A61H 2201/0107; A61H 23/0254; A61H 2015/0014; A61H 15/00; A61H 15/0078; A61H 2015/0007; A61H 2015/0021; A61H 15/0085; A61H 2201/0161; A63B 2023/006; A63B 2210/50; A63B 22/20
See application file for complete search history.

(56) References Cited

U.S. PATENT DOCUMENTS

| | | | | |
|---|---|---|---|---|
| 8,556,837 | B1 | 10/2013 | Poirier | |
| 10,561,923 | B1 | 2/2020 | Harvey | |
| 10,888,733 | B2 | 1/2021 | Earls et al. | |
| 11,096,860 | B2 | 8/2021 | DiPeri et al. | |
| 2016/0228323 | A1 * | 8/2016 | Cheng | A61H 15/0092 |
| 2017/0202729 | A1 | 7/2017 | Lin | |
| 2017/0202730 | A1 | 7/2017 | Lin | |
| 2018/0140897 | A1 * | 5/2018 | Hetrick | A63B 21/0601 |
| 2018/0326254 | A1 * | 11/2018 | Earls | A63B 26/003 |

FOREIGN PATENT DOCUMENTS

EP 3574885 A1 * 12/2019 ............... A45F 4/02

OTHER PUBLICATIONS

A Comparison: Vyper vs Wave Roller, https://youtu.be/vu4fXTXLW6k, 1 page, Aug. 9, 2020.

* cited by examiner

*Primary Examiner* — Brandy S Lee
*Assistant Examiner* — Rohan Patel

(57) ABSTRACT

A massaging roller may comprise a first cylinder and a second cylinder. The roller may be arranged in a first or second configuration depending on which end of the first cylinder is connected to which end of the second cylinder. In the first configuration, an interior space between opposing ends of the first and second cylinders may form a first cavity of a first size. Conversely, in the second configuration, an interior space between opposing ends of the first and second cylinders may form a second cavity of a second, smaller size. This may enable the roller to receive and secure therewithin vibration elements of different sizes. That is, vibration elements of different sizes may be used alone for therapeutic benefit or may be installed within one of the first cavity or the second cavity to impart vibration to the roller.

18 Claims, 5 Drawing Sheets

MASSAGING ROLLER

CROSS-REFERENCE TO RELATED APPLICATION(S)

This application claims priority to and the benefit of U.S. Provisional Patent Application Ser. No. 63/210,463, filed Jun. 14, 2021, the entire disclosure of which is hereby incorporated by reference.

TECHNICAL FIELD

This invention relates to physical therapy and, more particularly, to novel systems and methods for facilitating self-delivered physical therapy.

BACKGROUND

Foam rollers are devices that facilitate self-delivered physical therapy. What are needed are improved rollers that have greater versatility.

BRIEF DESCRIPTION OF THE DRAWINGS

The disclosure is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity.

DETAILED DESCRIPTION

Figure 1:
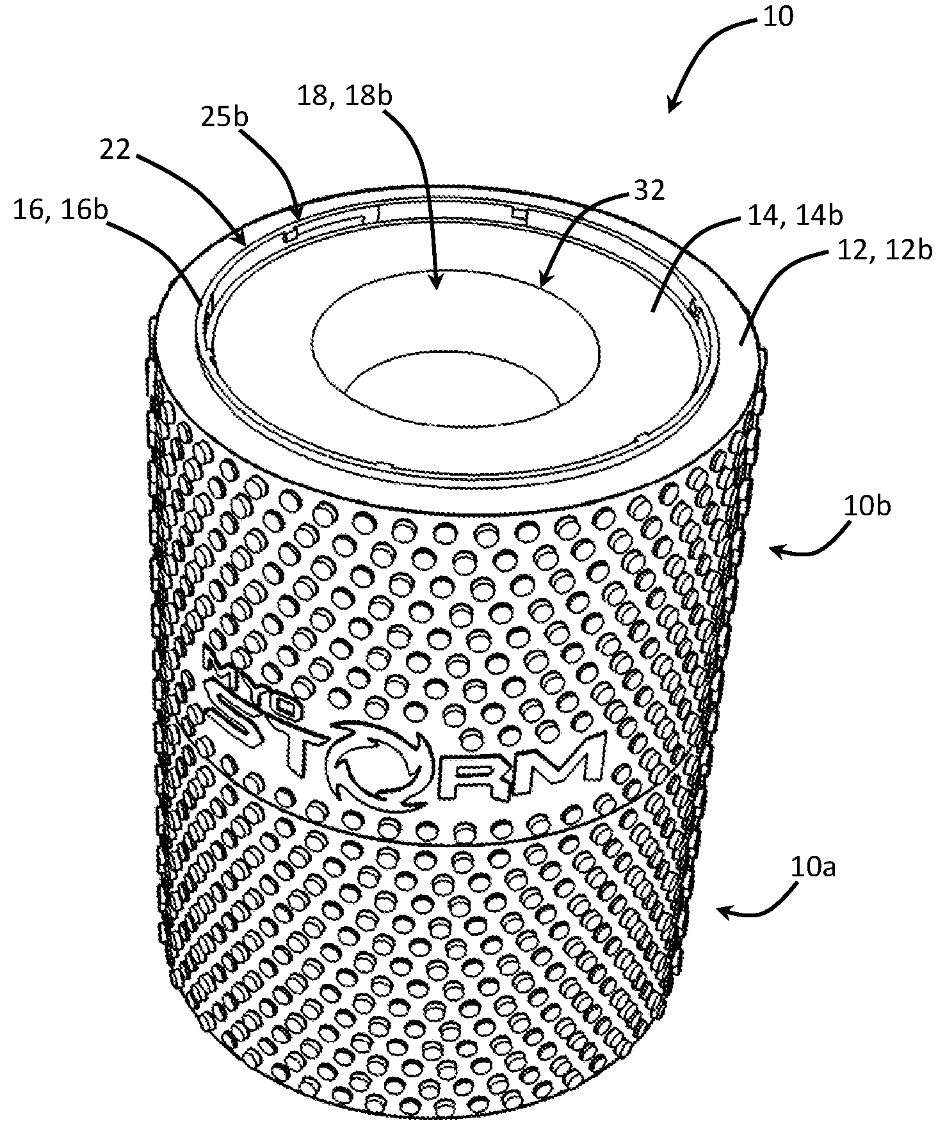
FIG. 1 is a perspective view of a roller in accordance with the present invention.

Disclosed herein are implementations of a massaging roller. A massaging roller may comprise a first cylinder and a second cylinder. The first cylinder may comprise a first end, a second end opposite the first end, and a first interior space defined between the first end and the second end. The second cylinder may comprise a third end, a fourth end opposite the third end, and a second interior space defined between the third end and the fourth end.

The massaging roller may be selectively arranged or assembled in a first configuration or a second configuration depending on which end of the first cylinder is connected to which end of the second cylinder. For example, in the first configuration, the second end may be connected to the third end. In the second configuration, the first end may be connected to the fourth end. When the first and second cylinders are connected in either the first configuration or in the second configuration, the first cylinder may be axially aligned with the second cylinder.

The first interior space and the second interior space in the first configuration may cooperatively define a first cavity at an interface between the second end and the third end. The first interior space and the second interior space in the second configuration may cooperatively define a second cavity at an interface between the first end and the fourth end. A volume of the first cavity may be different than a volume of the second cavity (e.g., greater than a volume of the second cavity).

At least a portion of the first cavity may be spherical in shape. At least a portion of the second cavity may also be spherical in shape. Accordingly, a ball (e.g., a vibrating massage ball comprising a motor that includes an eccentric weight affixed to a shaft, wherein the shaft spins to cause the ball to vibrate) of a first size may be securable within the first cavity when the massaging roller is in the first configuration. Alternatively, a ball (e.g., a vibrating massage ball) of a second, smaller size may be securable within the second cavity when the massaging roller is in the second configuration. Thus, either ball may be used alone (i.e., independent of the massaging roller) for therapeutic benefit or may be installed within one of the first cavity or the second cavity (i.e., whichever cavity best fits the ball) to impart vibration to the massaging roller.

The first cylinder may comprise a first tubular frame. The second cylinder may comprise a second tubular frame. The first tubular frame and the second tubular frame may comprise or be formed of a plastic material. The first tubular frame may comprise a first engagement mechanism at the first end and a second engagement mechanism at the second end. Similarly, the second tubular frame may comprise a third engagement mechanism at the third end and a fourth engagement mechanism at the fourth end. The second engagement mechanism may be connectable to the third engagement mechanism. The first engagement mechanism may be connectable to the fourth engagement mechanism.

The second engagement mechanism may be a second twist-to-lock mechanism and the third engagement mechanism may be a third twist-to-lock mechanism that mechanically engages with the second twist-to-lock mechanism. Similarly, the first engagement mechanism may be a first twist-to-lock mechanism and the fourth engagement mechanism may be a fourth twist-to-lock mechanism that mechanically engages with the first twist-to-lock mechanism. Alternatively, the second engagement mechanism may be a second threaded portion and the third engagement mechanism may be a third threaded portion that threadedly engages with the second threaded portion. Similarly, the first engagement mechanism may be a first threaded portion and the fourth engagement mechanism may be a fourth threaded portion that threadedly engages with the first threaded portion.

The first tubular frame may include a first exterior surface on which a first exterior foam (e.g., an elastic foam) may be disposed. Similarly, the second tubular frame may include a second exterior surface on which a second exterior foam (e.g., an elastic foam) may be disposed. The first exterior foam may be the same material (i.e., have the same composition) as the second exterior foam.

The first tubular frame may include a first interior surface on which a first interior foam (e.g., a rigid foam) may be disposed to define the first interior space. Similarly, the second tubular frame may include a second interior surface on which a second interior foam (e.g., a rigid foam) may be disposed to define the second interior space. The first interior foam and the second interior foam may be selected and configured to transmit vibration from a vibrating massage ball contained within either the first cavity or the second cavity to the first and second tubular frames. The first interior foam may be the same material (i.e., have the same composition) as the second interior foam.

In certain embodiments, a roller may be used to administer physical therapy. Such a roller may comprise a first cylinder and a second cylinder. At least part of both the first cylinder and the second cylinder may comprise a foam material. The first cylinder may comprise a first end, a second end opposite the first end, a first opening adjacent to the first end, and a second opening adjacent to the second end. A first aperture may extend from the first opening to the second opening. The second cylinder may comprise a third end, a fourth end opposite the third end, a third opening adjacent to the third end, and a fourth opening adjacent to the fourth end. A second aperture may extend from the third opening to the fourth opening.

The second end may engage the third end to secure the first cylinder in axial alignment with the second cylinder to form a first configuration. Alternatively, the first end may engage the fourth end to secure the first cylinder in axial alignment with the second cylinder to form a second configuration.

The second opening and the third opening in the first configuration may cooperatively define a first cavity. Similarly, the first opening and the fourth opening in the second configuration may cooperatively define a second cavity. A size of the first cavity may be different (e.g., larger) than a size of the second cavity. Accordingly, a vibrating massage ball of a first size may be securable within the first cavity and a vibrating massage ball of a second, smaller size may be securable within the second cavity.

In selected embodiments, a foam roller may form part of a therapeutic system. In such embodiments, the system may include a foam roller and a vibration element. The foam roller may comprise a tubular frame comprising a first end, a second end opposite the first end, a length extending between the first end and the second end, an interior surface, and an exterior surface. A first foam material may abut the interior surface and extend along the length to form an interior foam portion (i.e., an inner portion). A second foam material may abut the exterior surface and extend along the length to form an exterior foam portion (i.e., an outer portion).

The vibration element (e.g., a vibrating massage ball) may comprise a motor. The motor may be configured to cause the vibration element to vibrate. The vibration element may be positioned within the foam roller so that vibration originating with the vibration element may be transferred to the foam roller. For example, the interior foam portion may define a cavity. At least a portion of the cavity may match a geometry (e.g., an exterior geometry) of the vibration element. Accordingly, the vibration element may be secured or fixed in place within the cavity.

Figure 2:
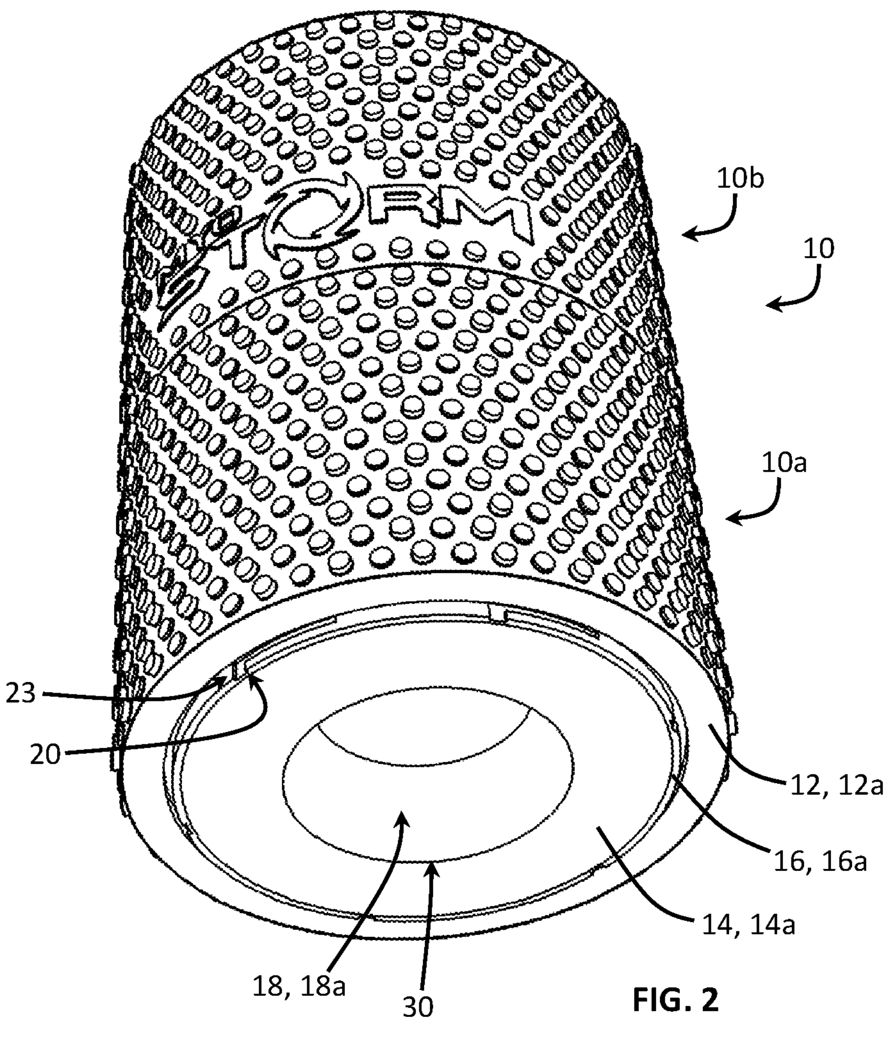
FIG. 2 is another perspective view of the roller of FIG. 1.
Figure 3:
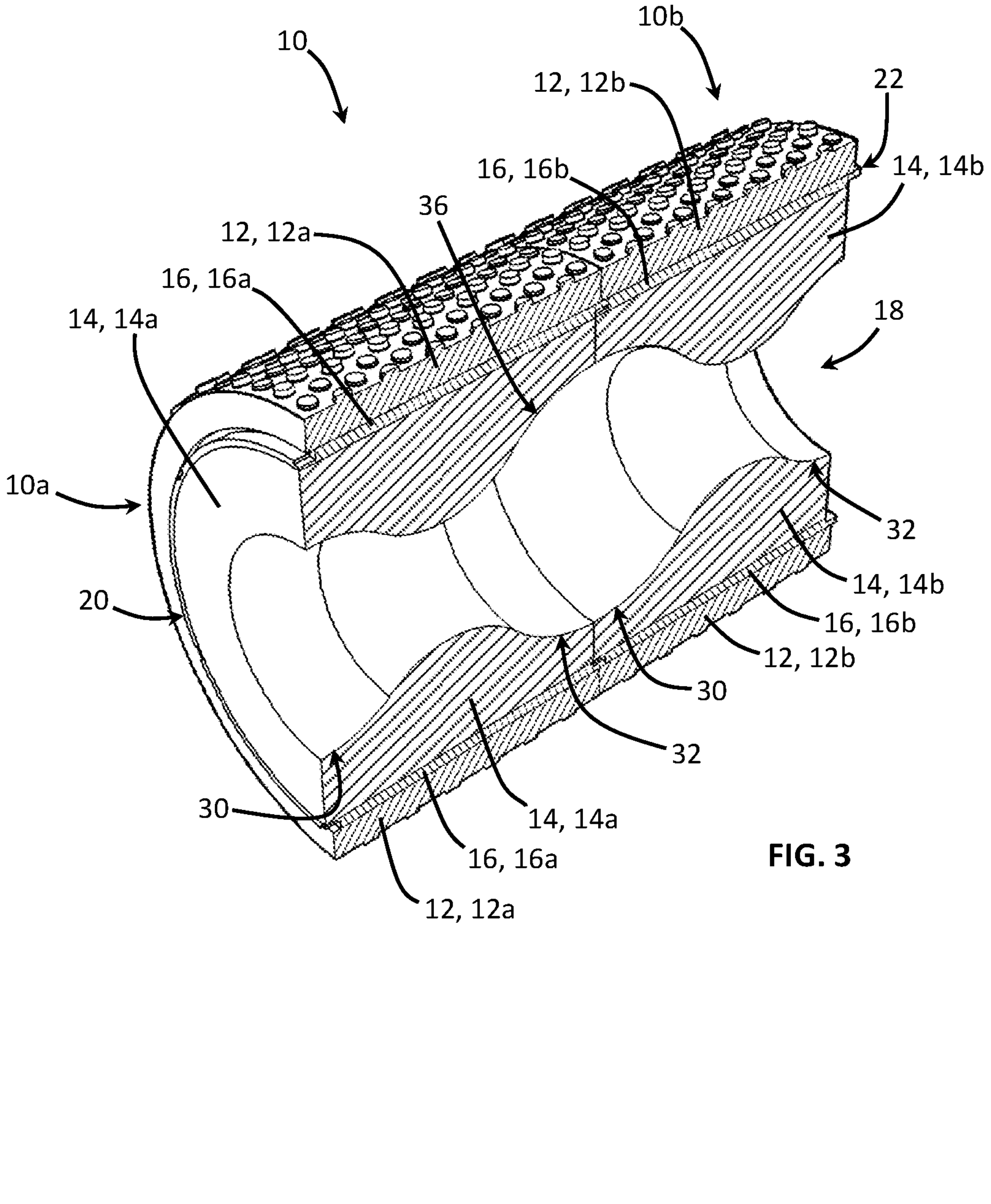
FIG. 3 is a perspective cross-sectional view of the roller of FIG. 1.
Figure 4:
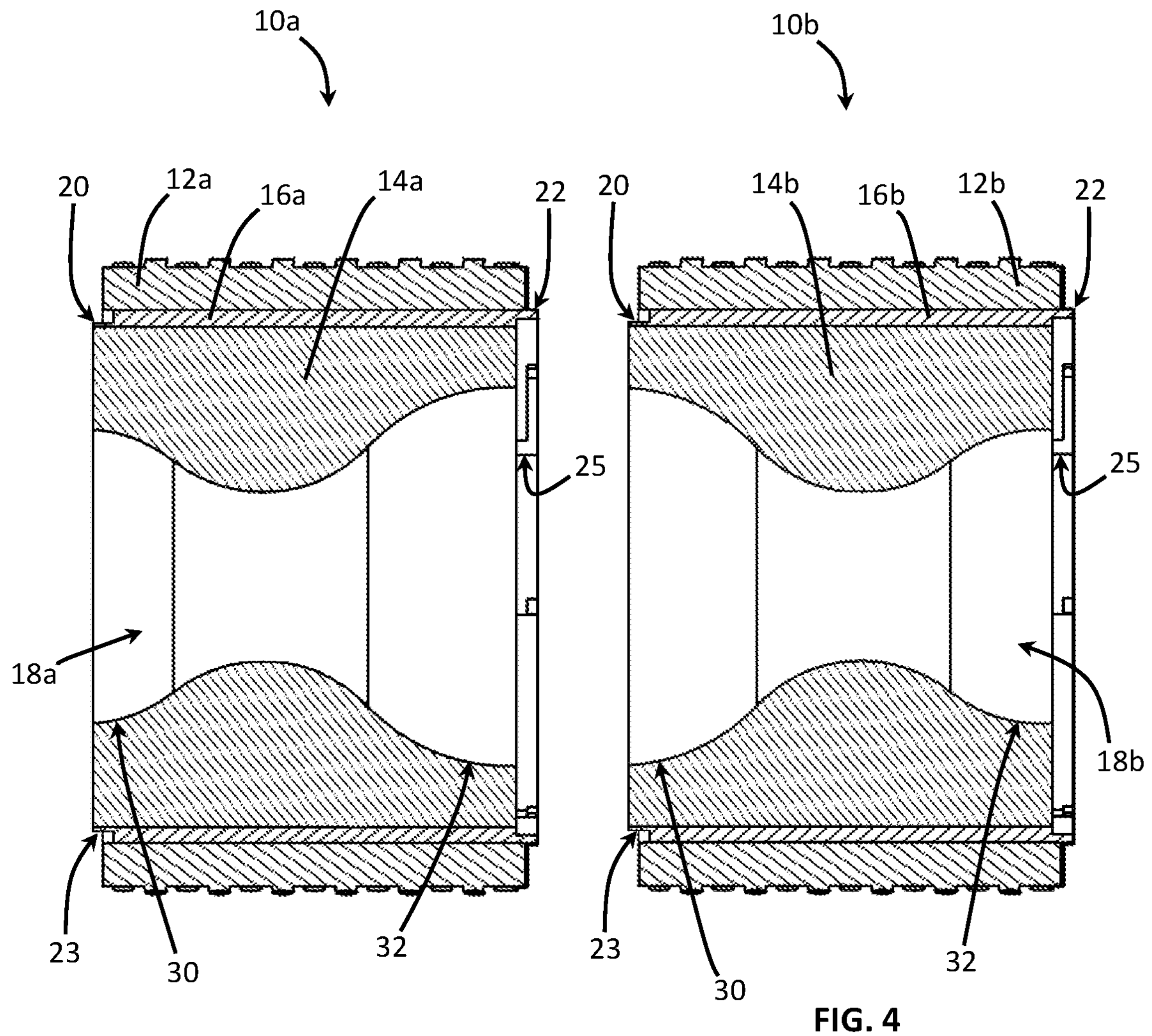
FIG. 4 is a cross-sectional view of the first and second cylinders that form the roller of FIG. 1.
Figure 5:
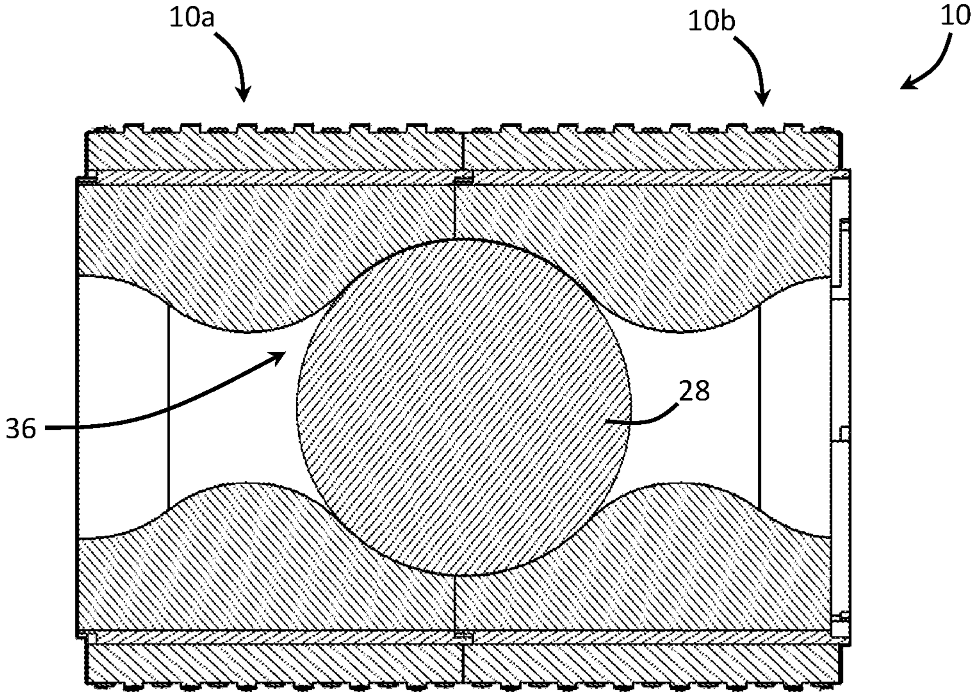
FIG. 5 is a cross-sectional view of the roller of FIG. 1 with a spherical vibration element of a first size positioned therewithin.
Figure 6:
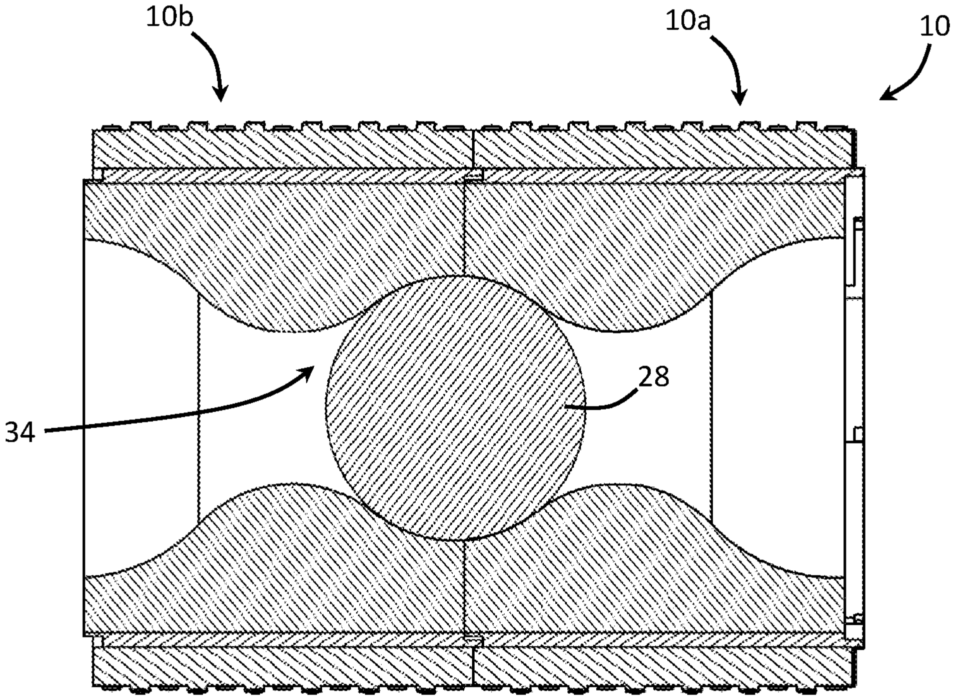
FIG. 6 is a cross-sectional view of the roller of FIG. 1 with a spherical vibration element of a second, smaller size positioned therewithin.

Referring to FIGS. 1-6, a roller 10 in accordance with the present invention may include an outer portion 12, an inner portion 14, and a frame 16. The outer portion 12 may be or comprise a cylinder of foam (e.g., elastic or compliant foam) or other suitable material that forms an exterior surface of the roller 10. The inner portion 14 may be or comprise a cylinder of foam (e.g., "rigid" foam, polystyrene foam, or the like) positioned interior to the outer portion 12. The inner portion 14 may define an inner cavity 18. The frame 16 may be positioned between the outer portion 12 and the inner portion 14. The frame 16 may be formed of a substantially rigid plastic or the like. The frame 16 may support the outer portion 12 and enable the outer portion 12 to flex, compress, or the like without the roller 10 flexing or compressing as a whole in a similar manner.

In selected embodiments, the roller 10 may be selectively separable into two opposing cylinders (e.g., a first cylinder 10*a* and a second cylinder 10*b*). Accordingly, the outer portion 12, the inner portion 14, and the frame 16 may each be divided into two opposing sections. That is, a first outer section 12*a* of the outer portion 12, a first inner section 14*a* of the inner portion 14, and a first frame section 16*a* (i.e., a first tubular frame) of the frame 16 may collectively form the first cylinder 10*a* of the roller 10, while a second outer section 12*b* of the outer portion 12, a second inner section 14*b* of the inner portion 14, and a second frame section 16*b* (i.e., a second tubular frame) of the frame 16 may collectively form the second cylinder 10*b* of the roller 10.

In selected embodiments or situations, the first outer section 12*a* may be referred to as a first exterior foam and a second outer section 12*b* may be referred to as a second exterior foam. Similarly, a first inner section 14*a* may be referred to as a first interior foam and a second inner section 14*b* may be referred to as a second interior foam.

In selected embodiments, the first frame section 16*a* and the second frame section 16*b* may each have a first end 20 and a second end 22 opposite the first end 20. The first end 20 of the first frame section 16*a* may include a first engagement mechanism 23 configured to mechanically engage (e.g., threadedly engage, engage via a twist-to-lock mechanism, or the like) a second engagement mechanism 25 forming part of the second end 20 of the second frame section 16*b*. Similarly, the first end 20 of the second frame section 16*b* may include a first engagement mechanism 23 configured to mechanically engage (e.g., threadedly engage, engage via a twist-to-lock mechanism, or the like) a second engagement mechanism 25 forming part of the second end 20 of the first frame section 16*a*. Accordingly, a user may select between a first configuration 24 and a second configuration 26 when connecting a first cylinder 10*a* to a second cylinder 10*b*.

For example, in certain embodiments or situations, a user may arrange a roller 10 in a first configuration 24 where a second end 22 of the first frame section 16*a* engages a first end 20 of the second frame section 16*b*. Alternatively, the user may arrange the roller 10 in a second configuration 24 where the second end 22 of the second frame section 16*b* engages a first end 20 of the first frame section 16*a*.

In selected embodiments or situations, a first end 20 of a second frame section 16*b* may be referred to as a "third end." Similarly, a second end 22 of the second frame section 16*b* may be referred to as a "fourth end." Thus, in the first configuration 24, the second end 20 of the first frame section 16*a* may engage the third end of the second frame section 16*b*. Conversely, in the second configuration 26, the fourth end of the second frame section 16*b* may engage the first end 20 of the first frame section 16*a*. In like manner, a first engagement mechanism 23 of a second frame section 16*b* may be referred to as a "third engagement mechanism," while a second engagement mechanism 25 of the second frame section 16*b* may be referred to as a "fourth engagement mechanism." Thus, in the first configuration 24, the second engagement mechanism 25 of the first frame section 16*a* may engage the third engagement mechanism of the second frame section 16*b*, while in the second configuration 26, the fourth engagement mechanism of the second frame section 16*b* may engage the first engagement mechanism 23 of the first frame section 16*a*.

When the first cylinder 10*a* and the second cylinder 10*b* of a roller 10 are separated from one another, a vibrating element 28 may be inserted within the inner cavity 18 defined by an inner portion 14. For example, a vibrating massage ball as disclosed in U.S. Pat. No. 11,096,860 issued Aug. 24, 2021, which is hereby incorporated by reference, may be positioned within the inner cavity 18. Vibration produced by a vibrating element 28 positioned within an inner cavity 18 of a roller 10 may enhance the therapeutic effect or benefit received when using the roller 10. However, when a user desires to use the vibrating element 28 by itself, the user may separate the first cylinder 10*a* from the second cylinder 10*b* and remove the vibrating element 28. Thus, in a system involving a roller 10 in accordance with the present invention and the vibrating element 28, a user may use the roller 10 by itself, the vibrating element 28 by itself, or the roller 10 with the vibrating element 28 positioned therewithin to provide a vibration to the roller 10.

In certain embodiments, the material forming an inner portion 14 of a roller 10 may be selected to efficiently transmit vibration from the vibration element 28 to the frame 16. Thus, while some of the vibration energy produced by the vibration element 28 may be absorbed by the inner portion 14, most of that energy may be transmitted through the inner portion 14 to the frame 16 and from the frame 16 through the outer portion 12 to the body of the user.

In selected embodiments, a first part 18*a* (i.e., a first interior cavity) of an inner cavity 18 may correspond to a first portion 14*a* of an inner portion 14, while a second part 18*b* (i.e., a second interior cavity) of an inner cavity 18 may correspond to a second portion 14*b* of the inner portion 14. The first part 18*a* and the second part 18*b* of an inner cavity 18 may each have a first end 30 (i.e., a first opening) and a second end 32 (i.e., a second opening) opposite the first end 30. The first end 30 of the first part 18*a* may cooperate with the second end 32 of the second part 18*b* to define a first cavity 34 that closely or snuggly fits a vibrating element 28 of a first size (e.g., a smaller size). Conversely, the second end 32 of a first part 18*a* may cooperate with the first end 30 of a second part 18*b* to define a second cavity 36 that closely or snuggly fits a vibrating element 28 of a second size (e.g., a larger size).

Accordingly, regardless of whether a user has a smaller vibrating element 28 or a larger vibrating element 28, the user is free to use that vibrating element 28 by itself or may quickly and easily disassemble the roller 10 (i.e., separate the first cylinder 10*a* from the second cylinder 10*b*), position the vibrating element 28 within an appropriate cavity within the roller 10, and reassemble the roller 10 (i.e., connect the first cylinder 10*a* to the second cylinder 10*b* in an appropriate order or configuration) so that a vibration produced by the vibrating element 28 may be passed to the roller 10 during use. In selected embodiments, a vibrating element 28 may be turned "ON" before it is installed in the roller 10. Alternatively, the vibrating element 28 may be installed within the roller 10 such that an ON/OFF switch or button of the massage ball may be manually accessible via the inner cavity when the roller 10 is in the first configuration 24 or the second configuration 26.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A massaging roller comprising:

a first cylinder comprising a first end, a second end opposite the first end, and a first interior space defined between the first end and the second end; and a second cylinder comprising a third end, a fourth end opposite the third end, and a second interior space defined between the third end and the fourth end;

wherein the second end is connectable to the third end to form a first configuration, the first end is connectable to the fourth end to form a second configuration, the first interior space and the second interior space in the first configuration cooperatively define a first cavity at an interface between the second end and the third end, the first interior space and the second interior space in the second configuration cooperatively define a second cavity at an interface between the first end and the fourth end, and a volume of the first cavity is greater than a volume of the second cavity.

2. The massaging roller of claim 1, wherein the first cylinder is axially aligned with the second cylinder in the first configuration and in the second configuration.

3. The massaging roller of claim 2, wherein:

the first cylinder further comprises a first tubular frame comprising a first engagement mechanism at the first end and a second engagement mechanism at the second end;

the second cylinder further comprises a second tubular frame comprising a third engagement mechanism at the third end and a fourth engagement mechanism at the fourth end;

the second engagement mechanism is connectable to the third engagement mechanism; and the first engagement mechanism is connectable to the fourth engagement mechanism.

4. The massaging roller of claim 3, wherein the first tubular frame and the second tubular frame comprise a plastic material.

5. The massaging roller of claim 3, wherein:

the second engagement mechanism is a second twist-to-lock mechanism and the third engagement mechanism is a third twist-to-lock mechanism that mechanically engages with the second twist-to-lock mechanism; and the first engagement mechanism is a first twist-to-lock mechanism and the fourth engagement mechanism is a fourth twist-to-lock mechanism that mechanically engages with the first twist-to-lock mechanism.

6. The massaging roller of claim 3, wherein:

the second engagement mechanism is a second threaded portion and the third engagement mechanism is a third threaded portion that threadedly engages with the second threaded portion; and the first engagement mechanism is a first threaded portion and the fourth engagement mechanism is a fourth threaded portion that threadedly engages with the first threaded portion.

7. The massaging roller of claim 3, wherein:

the first tubular frame includes a first exterior surface on which a first exterior foam is disposed; and the second tubular frame includes a second exterior surface on which a second exterior foam is disposed.

8. The massaging roller of claim 7, wherein:

the first tubular frame includes a first interior surface on which a first interior foam is disposed to define the first interior space; and the second tubular frame includes a second interior surface on which a second interior foam is disposed to define the second interior space.

9. The massaging roller of claim 8, wherein:

the first interior foam and the second interior foam comprise a rigid foam; and the first exterior foam and the second exterior foam comprise an elastic foam.

10. The massaging roller of claim 1, wherein at least a portion of the first cavity is spherical.

11. The massaging roller of claim 10, wherein at least a portion of the second cavity is spherical.

12. The massaging roller of claim 10, further comprising a ball securable within the first cavity, the ball comprising a motor that includes an eccentric weight affixed to a shaft, wherein the shaft spins to cause the ball to vibrate.

13. A roller comprising:

a first cylinder comprising a first end, a second end opposite the first end, a first opening adjacent to the first end, and a second opening adjacent to the second end; and a second cylinder comprising a third end, a fourth end opposite the third end, a third opening adjacent to the third end, and a fourth opening adjacent to the fourth end;

wherein the second end engages the third end to secure the first cylinder in axial alignment with the second cylinder to form a first configuration, the first end engages the fourth end to secure the first cylinder in axial alignment with the second cylinder to form a second configuration, the first opening and the third opening in the first configuration cooperatively define a first cavity, the second opening and the fourth opening in the second configuration cooperatively define a second cavity, and a size of the first cavity is greater than a size of the second cavity.

14. The roller of claim 13, wherein:

a first aperture extends from the first opening to the second opening; and a second aperture extends from the third opening to the fourth opening.

15. The roller of claim 13, wherein:

the second end includes a second twist-to-lock mechanism and the third end includes a third twist-to-lock mechanism that mechanically engages with the second twist-to-lock mechanism; and the first end includes a first twist-to-lock mechanism and the fourth end includes a fourth twist-to-lock mechanism that mechanically engages with the first twist-to-lock mechanism.

16. The roller of claim 13, wherein:

the second end includes a second threaded portion and the third end includes a third threaded portion that threadedly engages with the second threaded portion; and the first end includes a first threaded portion and the fourth end includes a fourth threaded portion that threadedly engages with the first threaded portion.

17. The roller of claim 13, wherein at least a portion of the first cavity is spherical.

18. The roller of claim 17, further comprising a ball securable within the first cavity, the ball comprising a motor that includes an eccentric weight affixed to a shaft, wherein the shaft spins to cause the ball to vibrate.

* * * * *